US008190432B2

(12) United States Patent
Matsumoto

(10) Patent No.: US 8,190,432 B2
(45) Date of Patent: May 29, 2012

(54) SPEECH ENHANCEMENT APPARATUS, SPEECH RECORDING APPARATUS, SPEECH ENHANCEMENT PROGRAM, SPEECH RECORDING PROGRAM, SPEECH ENHANCING METHOD, AND SPEECH RECORDING METHOD

(75) Inventor: Chikako Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 982 days.

(21) Appl. No.: 11/882,312

(22) Filed: Jul. 31, 2007

(65) Prior Publication Data

US 2008/0065381 A1 Mar. 13, 2008

(30) Foreign Application Priority Data

Sep. 13, 2006 (JP) ................................ 2006-248587

(51) Int. Cl.
*G10L 15/04* (2006.01)

(52) U.S. Cl. ........................................................ 704/254

(58) Field of Classification Search ................... 704/254
See application file for complete search history.

(56) References Cited

U.S. PATENT DOCUMENTS 4,783,807 A * 11/1988 Marley .......................... 704/235
5,146,502 A 9/1992 Davis
5,799,276 A * 8/1998 Komissarchik et al. ....... 704/251
6,006,175 A * 12/1999 Holzrichter ................... 704/208
6,359,354 B1 * 3/2002 Watanabe et al. ............... 310/87
6,728,680 B1 * 4/2004 Aaron et al. .................. 704/271
6,889,186 B1 5/2005 Michaelis
7,216,079 B1 * 5/2007 Barnard et al. ............... 704/244
2001/0037202 A1 * 11/2001 Yamada et al. ............... 704/258
2005/0049856 A1 * 3/2005 Baraff ........................... 704/219
2007/0038455 A1 2/2007 Murzina et al.

FOREIGN PATENT DOCUMENTS

EP 1 168 306 A2 1/2002
JP 61-26099 2/1986
JP 2-083595 3/1990
JP 2-203399 8/1990
JP 8-275087 10/1996

(Continued)

OTHER PUBLICATIONS

C. A. Troy et al., "Prototype LVQ Based Computerized Tool for Accent Diagnosis among Chinese Speakers of English as A Foreign Language", Journal of Da-Yeh University, [Online], vol. 8, No. 2, 1999, pp. 53-62, XP002483431, Retrieved from the Internet: URL:http://journal.dyu.edu.tw/dyujo/document/cv8n206.pdf.

(Continued)

*Primary Examiner* — Jakieda Jackson
(74) *Attorney, Agent, or Firm* — Staas & Halsey LLP

(57) ABSTRACT

To automatically detect and automatically correct in a reproduced speech, defective portions related to plosives such as existence or absence of plosive portions, phoneme lengths of aspirated portions that continue after the plosive portions or defective portions related to amplitude variations of fricatives. Speech wherein consonants and unvoiced vowels are unclear and discordant is input into a speech enhancement apparatus according to the present invention. In the speech enhancement apparatus, the speech is split into phonemes and each phoneme is classified into any one of an unvoiced plosive, a voiced plosive, an unvoiced fricative, a voiced fricative, an affricate, and an unvoiced vowel. Each phoneme is corrected according to a determination of necessity of correction of each phoneme to obtain an output of the speech wherein the consonants and the unvoiced vowels are clear and not discordant.

9 Claims, 9 Drawing Sheets

FOREIGN PATENT DOCUMENTS

| | | | |
|---|---|---|---|
| JP | 9-016193 | | 1/1997 |
| JP | 10-078798 | | 3/1998 |
| JP | 2000-066694 | | 3/2000 |
| JP | 2002-014689 | | 1/2002 |
| JP | 2002-268672 | | 9/2002 |
| JP | 2003-345373 | | 12/2003 |
| JP | 2004-4952 | | 1/2004 |
| JP | 2007-511793 | | 5/2007 |
| WO | 2004/066271 | A1 | 8/2004 |
| WO | 2005/048242 | A1 | 5/2005 |

OTHER PUBLICATIONS

Hansen J. H. L. et al. "Text-directed speech enhancement employing phone class parsing and feature map constrained vector quantization" Speech Communication, Elsevier Science Publishers, Amsterdam, NL, vol. 21, No. 3, Apr. 1, 1997, pp. 169-189.

European Search Report, Jul. 2, 2008.

Japanese Office Action issued Apr. 7, 2011 in corresponding Japanese Patent Application 2006-248587.

* cited by examiner

SPEECH ENHANCEMENT APPARATUS, SPEECH RECORDING APPARATUS, SPEECH ENHANCEMENT PROGRAM, SPEECH RECORDING PROGRAM, SPEECH ENHANCING METHOD, AND SPEECH RECORDING METHOD

FIELD OF THE INVENTION

The present invention relates to a speech enhancement apparatus, a speech recording apparatus, a speech enhancement program, a speech recording program, a speech enhancing method, and a speech recording method which correct and output unclear portions of input speech data, and, more particularly to a speech enhancement apparatus, a speech recording apparatus, a speech enhancement program, a speech recording program, a speech enhancing method, and a speech recording method which automatically detect and automatically correct defective portions related to plosives such as existence or absence of plosive portions, phoneme lengths of aspirated portions that continue after the plosive portions, or defective portions related to amplitude variation of fricatives.

DESCRIPTION OF THE RELATED ART

Speech data, which includes recorded speech including human voice, can be easily replicated. Due to this, the speech data is commonly reused several times. Especially, because the speech data that includes digitally recorded speech can be easily redistributed such as during podcasting on the Internet, the speech data is frequently reused.

However, the human voice is not always vocalized distinctly. For example, in the human voice, a volume of a plosive or a fricative is higher compared to other syllables or a lip noise is included, thus making the human voice extremely difficult to hear. Moreover, because the speech data is easily replicated and redistributed, consonant portions become unclear due to down sampling and repeated encoding and decoding. The reproduced speech data becomes significantly difficult to hear due to the consonant portions becoming unclear.

However, even if the consonant portions in the speech data are unclear or the speech data includes lip noise, because rerecording requires further person hours, the speech data is distributed with the recorded speech as it is. Further, even if the consonant portions have become unclear due to down sampling or repeated encoding and decoding, a user must tolerate such defects as sound quality deterioration due to replication.

For reproducing the speech data that is easier to hear, various technologies are suggested for automatically detecting and automatically correcting the defective portions of the recorded speech data. For example, in a technology for enhancing clarity of the consonant portions in the speech, a noise frequency component included in the speech is cut using a low pass filter, thus making a speech band easier to hear.

In a consonant enhancing method, which is disclosed in Japanese Patent Application Laid-Open No. H8-275087 as a method to enhance the consonant portions, the consonant portions detected by a cepstrum pitch are enhanced by convolving a control function in the cepstrum to shorten the cepstrum pitch.

Based on phonological data, a speech synthesizer disclosed in Japanese Patent Application Laid-Open No. 2004-4952 carries out band enhancement of the consonant portions or an amplitude enhancing process on the consonants or a continuation of the consonants and subsequent vowels. Further, a speech synthesizer disclosed in Japanese Patent Application Laid-Open No. 2003-345373 includes a filter that uses as a transfer function, spectral characteristics that indicate characteristics of unvoiced consonants. The speech synthesizer carries out a filtering process on a spectrum distribution of phonemes to enhance characteristics of the spectrum distribution.

However, the consonants or unvoiced vowels may include sounds with low speech clarity or discordant sounds due to defects related to plosives such as existence or absence of plosive portions, phoneme lengths of aspirated portions that continue after the plosive portions, or defects related to amplitude variation of fricatives. Due to this, although a conventional technology represented in Patent documents 1 to 3 can be used to detect and correct the consonants or voiced vowels, the conventional technology cannot be used to further split the phonemes to detect and to correct the defective portions related to the plosives or the defective portions related to amplitude variation of the fricatives. Moreover, if original speech itself includes defects, only enhancing the consonant portions of the original speech also enhances the defective portions and the speech becomes further difficult to hear.

It is an object of the present invention to solve the defects mentioned earlier and to provide a speech enhancement apparatus, a speech recording apparatus, a speech enhancement program, a speech recording program, a speech enhancing method, and a speech recording method which automatically detect and automatically correct, in the reproduced speech, defective portions related to the plosives such as existence or absence of the plosive portions, the phoneme lengths of the aspirated portions that continue after the plosive portions, or defective portions related to amplitude variation of the fricatives.

SUMMARY OF THE INVENTION

It is an object of the present invention to at least partially solve the problems in the conventional technology.

According to one aspect of the present invention, a speech enhancement apparatus that corrects and outputs unclear portions of input speech data, includes a waveform-feature-quantity calculating unit that calculates a waveform feature quantity of the speech data for each phoneme, the speech data being input along with phoneme boundary data that splits the speech data into phonemes; a correction determining unit that determines a necessity of correction of the speech data for each phoneme, based on the waveform feature quantity calculated by the waveform-feature-quantity calculating unit; and a waveform correcting unit that corrects the speech data, the necessity of correction thereof is determined by the correction determining unit, for each phoneme by using waveform data that is prior stored in a phonemewise-waveform-data storage unit.

According to another aspect of the present invention, a speech recording apparatus that records input speech data in a phonemewise-waveform-data storage unit, includes a phoneme-identification-data output unit that assigns phoneme identification data to the speech data, based on the input speech data and a phoneme string that is output by carrying out a language process on text data of the speech data, determines boundaries of the phoneme identification data, and outputs boundary data of the phoneme identification data as the phoneme boundary data; a waveform-feature-quantity calculating unit that calculates a waveform feature quantity of the speech data for each phoneme, the speech data being input along with the boundary data of the phoneme identification data output by the phoneme-identification-data output unit; a condition sufficiency determining unit that determines whether the speech data satisfies predetermined conditions for each phoneme, based on the waveform feature quantity calculated by the waveform-feature-quantity calculating unit; and a phonemewise-waveform-data recording unit that records in the phonemewise-waveform-data storage unit, the speech data of each phoneme that is determined to be satisfied the predetermined conditions, based on a determination by the condition sufficiency determining unit.

According to still another aspect of the present invention, a computer-readable recording medium that stores therein a speech enhancing program that causes a computer to correct and output unclear portions of input speech data, the speech enhancing program causes the computer to execute: calculating a waveform feature quantity of the speech data for each phoneme, the speech data being input along with phoneme boundary data that splits the speech data into phonemes; determining a necessity of correction of the speech data for each phoneme, based on the waveform feature quantity calculated in calculating the waveform-feature-quantity; and correcting the speech data, the necessity of correction thereof is determined in the determining, for each phoneme by using waveform data that is prior stored in a phonemewise-waveform-data storage unit.

According to still another aspect of the present invention, a computer-readable recording medium that stores therein a speech recording program that causes a computer to record input speech data in a phonemewise-waveform-data storage unit, the speech recording program causes the computer to execute: assigning phoneme identification data to the speech data, based on the input speech data and a phoneme string that is output by carrying out a language process on text data of the speech data, determining boundaries of the phoneme identification data, and outputting boundary data of the phoneme identification data as the phoneme boundary data; calculating a waveform feature quantity of the speech data for each phoneme, the speech data being input along with the boundary data of the phoneme identification data output from the outputting; determining whether the speech data satisfies predetermined conditions for each phoneme, based on the waveform feature quantity calculated in calculating; and recording in the phonemewise-waveform-data storage unit, the speech data of each phoneme that is determined to be satisfied the predetermined conditions, based on a determination in determining.

According to still another aspect of the present invention, a speech enhancing method that corrects and outputs unclear portions of input speech data according to the present invention, includes calculating a waveform feature quantity of the speech data for each phoneme, the speech data being input along with phoneme boundary data that splits the speech data into phonemes; determining a necessity of correction of the speech data for each phoneme, based on the waveform feature quantity calculated in calculating; and correcting the speech data, the necessity of correction thereof is determined in determining, for each phoneme by using waveform data that is prior stored in a phonemewise-waveform-data storage unit.

According to still another aspect of the present invention, a speech recording method that corrects and outputs unclear portions of input speech data according to the present invention, includes assigning phoneme identification data to the speech data, based on the input speech data and a phoneme string that is output by carrying out a language process on text data of the speech data, determining boundaries of the phoneme identification data, and outputting boundary data of the phoneme identification data as the phoneme boundary data; calculating a waveform feature quantity of the speech data for each phoneme, the speech data being input along with the boundary data of the phoneme identification data output from the outputting; determining whether the speech data satisfies predetermined conditions for each phoneme, based on the waveform feature quantity calculated in calculating; and recording in the phonemewise-waveform-data storage unit, the speech data of each phoneme that is determined to be satisfied the predetermined conditions, based on a determination in the determining.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the speech enhancement apparatus, the speech recording apparatus, the speech enhancement program, the speech recording program, the speech enhancing method, and the speech recording method according to the present invention are explained below with reference to the accompanying drawings. In a first and a second embodiments explained below, the present invention is applied to a speech enhancement apparatus that is mounted on a computer that is connected to an output unit (for example, a speaker) and that reproduces speech data and outputs the reproduced speech data via the output unit. However, the present invention is not to be thus limited, and can be widely applied to a speech reproducing apparatus that voices speech that is reproduced from the output unit. Further, in a third embodiment explained below, the present invention is applied to a speech recording apparatus that is mounted on a computer that is connected to an input unit (for example, a microphone) and a storage unit that stores therein sampled input speech.

Figure 1:
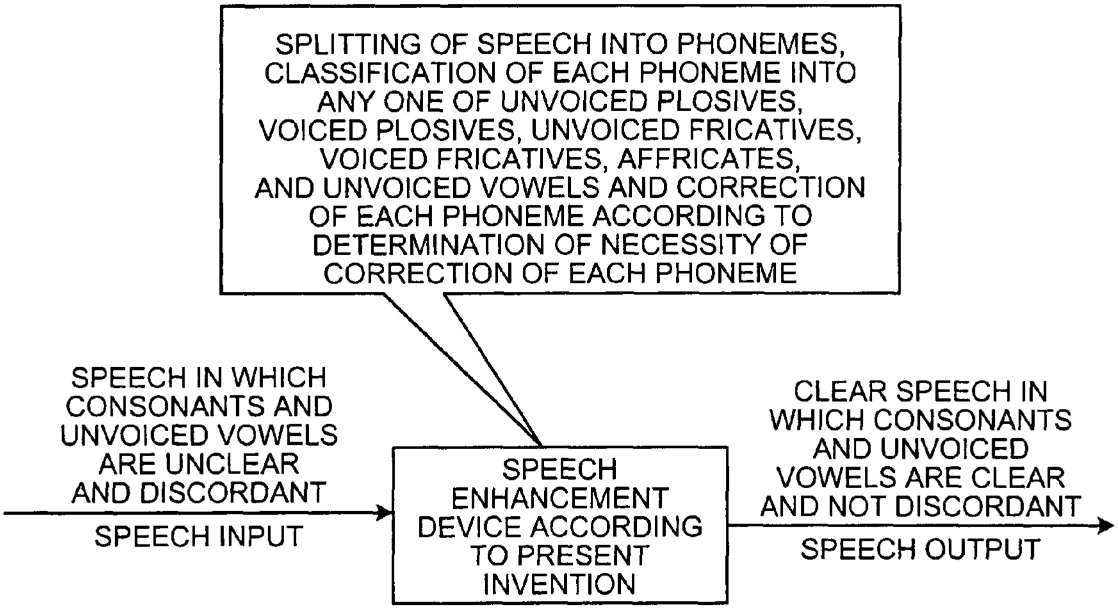
FIG. 1 is an explanatory diagram for explaining a salient feature of the present invention.

A salient feature of the present invention is explained before explaining the first to the third embodiments of the present invention. FIG. 1 is a explanatory diagram for explaining the salient feature of the present invention. As shown in FIG. 1, speech, which includes consonants and unvoiced vowels that are unclear or discordant, is input into the speech enhancement apparatus according to the present invention. The speech enhancement apparatus splits the speech into phonemes and classifies each phoneme as any one of an unvoiced plosive, a voiced plosive, an unvoiced fricative, a voiced fricative, an affricate, or an unvoiced vowel. Each phoneme is corrected according to a determination of necessity of correction of each phoneme, thus enabling to obtain an output of a clear speech that includes clear consonants and unvoiced vowels and that is not discordant.

However, in the speech, which is difficult to hear and includes sounds of low speech clarity or discordant sounds, the consonants and the unvoiced vowels are often unclear. Especially, if the sounds of low speech clarity or the discordant sounds are included in the consonants and the unvoiced vowels, defects often include defects due to plosives such as existence or absence of plosive portions, phoneme lengths of aspirated portions that continue after the plosive portions or defects due to amplitude variation of fricatives. Because the consonant portions are simply enhanced in a conventional technology, if the original speech itself includes defects, defective portions are also enhanced and the speech becomes further difficult to hear. Moreover, defective portions related to the plosives or defective portions related to the amplitude variation of the fricatives cannot be detected and corrected.

The present invention is carried out for overcoming the defects mentioned earlier. In the present invention, for making the speech easier to hear for a listener, based on a feature quantity of each phoneme in the speech and phoneme data before and after the phoneme, a feature quantity according to a type of the phoneme is calculated to detect defective portions due to the plosives such as existence or absence of the plosive portions, the phoneme lengths of the aspirated portions that continue after the plosive portions or defective portions due to the amplitude variation of the fricatives. Automatic correction such as phoneme substitution and phoneme supplementation is enabled.

Example 1

Figure 2:
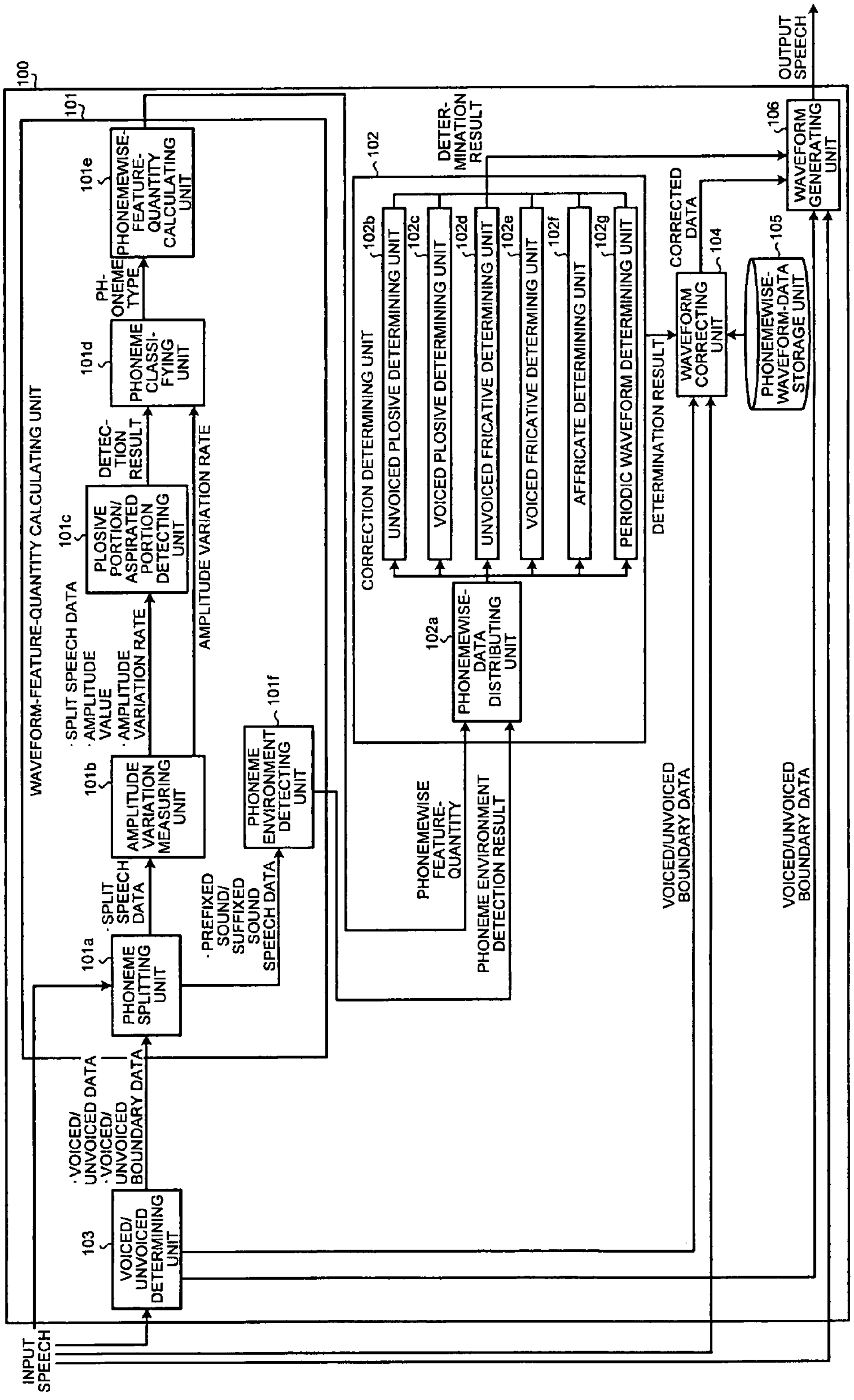
FIG. 2 is a functional block diagram of a speech enhancement apparatus according a first embodiment of the present invention.
Figure 3:
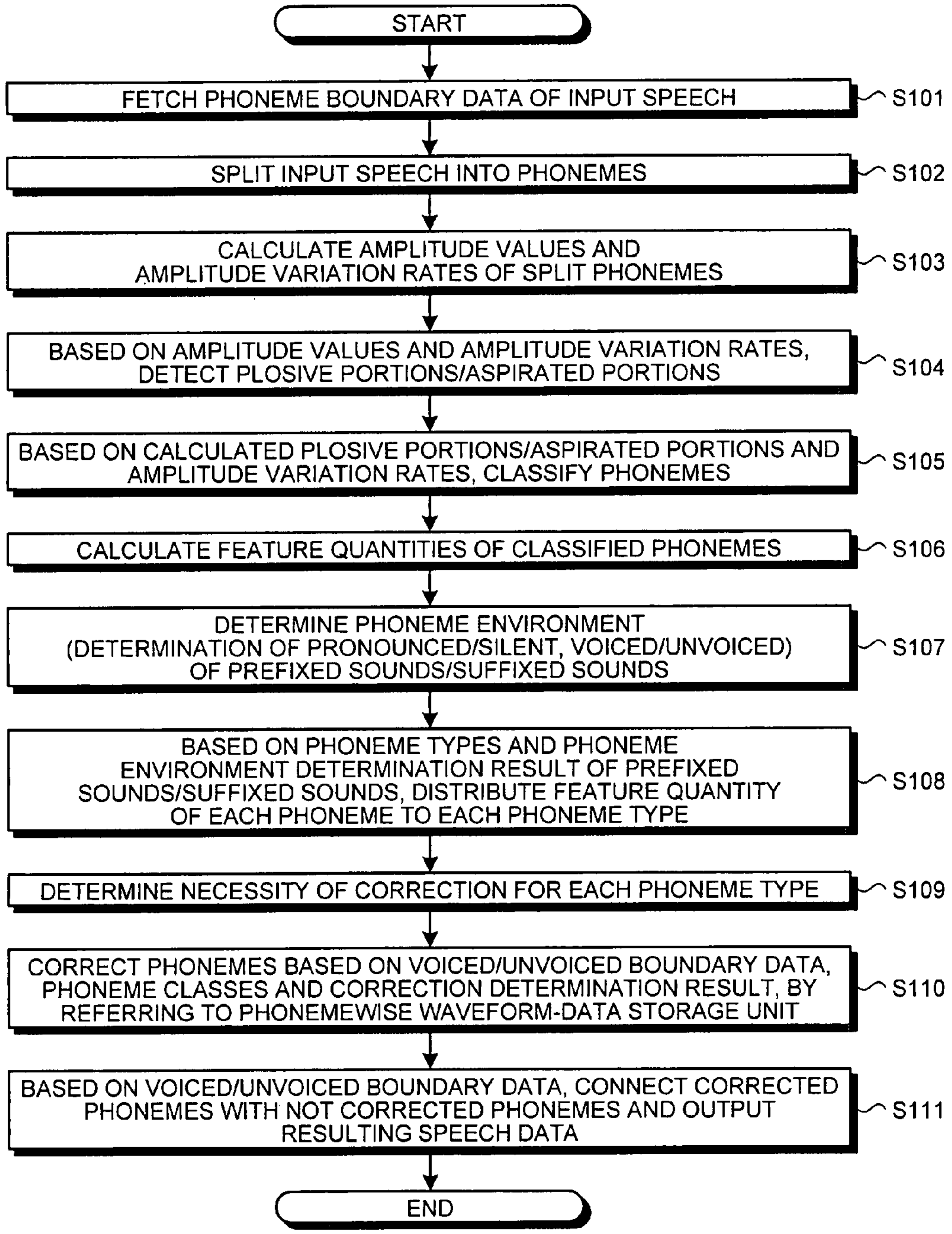
FIG. 3 is a flowchart of a speech enhancing process according to the first embodiment.

The first embodiment of the present invention is explained with reference to FIGS. 2 and 3. FIG. 2 is a functional block diagram of the speech enhancement apparatus according to the first embodiment. As shown in FIG. 2, a speech enhancement apparatus 100 includes a waveform-feature-quantity calculating unit 101, a correction determining unit 102, a voiced/unvoiced determining unit 103, a waveform correcting unit 104, a phonemewise-waveform-data storage unit 105, and a waveform generating unit 106.

The waveform-feature-quantity calculating unit 101 splits the input speech into the phonemes and outputs a phonemewise feature quantity. The waveform-feature-quantity calculating unit 101 includes a phoneme splitting unit 101*a*, an amplitude variation measuring unit 101*b*, a plosive portion/aspirated portion detecting unit 101*c*, a phoneme classifying unit 101*d*, a phonemewise-feature-quantity calculating unit 101*e*, and a phoneme environment detecting unit 101*f*.

Based on phoneme boundary data, the phoneme splitting unit 101*a* splits the input speech. If split phoneme data includes periodic components, the phoneme splitting unit 101*a* uses a low pass filter to prior remove low frequency components.

The amplitude variation measuring unit 101*b* splits into n ($n \geqq 2$) number of frames, the speech data that is split by the phoneme splitting unit 101*a*, calculates an amplitude value of each frame, averages a maximum value of the amplitude values, and uses a variation rate of the average to detect an amplitude variation rate.

Based on the amplitude value and the amplitude variation rate that are calculated by the amplitude variation measuring unit 101*b*, the plosive portion/aspirated portion detecting unit 101*c* detects whether the speech data that is split by the phoneme splitting unit 101*a* includes the plosive portions. In an example of a plosive portion detecting method, after splitting the speech data into pronounced portions and silent portions, a zero cross distribution (zero distribution of a waveform of the speech data) and the amplitude variation rate of the pronounced portions are used to detect the plosive portions. If the split speech data includes the plosive portions, the plosive portion/aspirated portion detecting unit 101*c* detects lengths of the plosive portions and lengths of the aspirated portions that continue after the plosive portions.

From existence or absence of the plosive portions and existence or absence of the aspirated portions, which is a detection result by the plosive portion/aspirated portion detecting unit 101*c*, based on the amplitude variation rate calculated by the amplitude variation measuring unit 101*b*, the phoneme classifying unit 101*d* classifies the phonemes as waveforms of any one of the unvoiced plosives, the voiced plosives, the unvoiced fricatives, the affricates, the voiced fricatives, and the periodic waveforms.

The phonemewise-feature-quantity calculating unit 101*e* calculates the feature quantity of each phoneme type that is classified by the phoneme splitting unit 101*a* and outputs the feature quantity as the phonemewise feature quantity. For example, if the phoneme type is the unvoiced plosive, the feature quantity includes existence or absence of the plosive portions, a number of the plosive portions, a maximum amplitude value of the plosive portions, existence or absence of the aspirated portions, the lengths of the aspirated portions, and the lengths of silent portions before the plosive portions. If the phoneme type is the affricate, the feature quantity includes the lengths of the silent portions before the plosive portions, the amplitude variation rate, and the maximum amplitude value. If the phoneme type is the unvoiced fricative, the feature quantity includes the amplitude variation rate and the maximum amplitude value. If the phoneme type is the voiced plosive, the feature quantity includes existence or absence of the plosive portions.

The phoneme environment detecting unit 101*f* determines prefixed sounds and suffixed sounds of the phonemes of the phoneme data that is split by the phoneme splitting unit 101*a*. The phoneme environment detecting unit 101*f* determines whether the prefixed sounds and the suffixed sounds are silent or pronounced or whether the prefixed sounds and the suffixed sounds are voiced or unvoiced. The phoneme environment detecting unit 101*f* outputs a determination result as a phoneme environment detection result.

The phonemewise feature quantities and the phoneme classes which are calculated by the waveform-feature-quantity calculating unit 101 are input into the correction determining unit 102. Based on each phoneme class and the phonemewise feature quantity, the correction determining unit 102 determines whether the phoneme needs to be corrected. The correction determining unit 102 includes a phonemewise data distributing unit 102*a*, an unvoiced plosive determining unit 102*b*, a voiced plosive determining unit 102*c*, an unvoiced fricative determining unit 102*d*, a voiced fricative determining unit 102*e*, an affricate determining unit 102*f*, and a periodic waveform determining unit 102*g*.

Based on the phoneme type and the phoneme environment, the phonemewise data distributing unit 102*a* distributes the phonemewise feature quantities calculated by the phonemewise-feature-quantity calculating unit 101*e* to determining units of the phoneme type, in other words, to any one of the unvoiced plosive determining unit 102*b*, the voiced plosive determining unit 102*c*, the unvoiced fricative determining unit 102*d*, the voiced fricative determining unit 102*e*, the affricate determining unit 102*f*, and the periodic waveform determining unit 102*g*.

The unvoiced plosive determining unit 102*b* receives an input of the phonemewise feature quantity of the unvoiced plosives, determines whether to correct the phoneme based on the phonemewise feature quantity, and outputs a determination result. The voiced plosive determining unit 102*c* receives an input of the phonemewise feature quantity of the voiced plosives, determines whether to correct the phoneme based on the phonemewise feature quantity, and outputs a determination result. The unvoiced fricative determining unit 102*d* receives an input of the phonemewise feature quantity of the unvoiced fricatives, determines whether to correct the phoneme based on the phonemewise feature quantity, and outputs a determination result. The voiced fricative determining unit 102*e* receives an input of the phonemewise feature quantity of the voiced fricatives, determines whether to correct the phoneme based on the phonemewise feature quantity, and outputs a determination result. The affricate determining unit 102*f* receives an input of the phonemewise feature quantity of the affricates, determines whether to correct the phoneme based on the phonemewise feature quantity, and outputs a determination result. The periodic waveform determining unit 102*g* receives an input of the phonemewise feature quantity of the periodic waveforms (unvoiced vowels), determines whether to correct the phoneme based on the phonemewise feature quantity, and outputs a determination result.

If the speech data includes silent sounds in series, the phonemewise-feature-quantity calculating unit 101*e* treats a silent portion as a boundary to calculate the feature quantity.

The input speech is input into the voiced/unvoiced determining unit 103. The voiced/unvoiced determining unit 103 classifies the input speech into voiced and unvoiced portions and outputs voiced/unvoiced data and voiced/unvoiced boundary data that indicates whether the portions are voiced or unvoiced consisting of the unvoiced fricatives, the unvoiced plosives etc. The voiced/unvoiced determining unit 103 determines a power that is less than or equal to a threshold value (for example, 250 Hz) of a low frequency of the input speech. From data which is normalized using a maximum power value per time frame (for example, 0.2 seconds), the voiced/unvoiced determining unit 103 determines as unvoiced, the portions that are less than or equal to the threshold value and determines as voiced, the portions that are greater than or equal to the threshold value.

The waveform correcting unit 104 receives an input of the input speech, the voiced/unvoiced boundary data of the input speech, the determination result by the correction determining unit 102, and the phoneme classes. The waveform correcting unit 104 uses waveform data stored in the phonemewise-waveform-data storage unit 105 to carry out substitution or addition (supplementation) to the original data and corrects the phonemes that need to be corrected. The waveform correcting unit 104 outputs the speech data after correction.

Based on the phonemewise feature quantity and the phoneme environment detection result, the waveform correcting unit 104 determines whether to correct the phonemes. For example, if the phoneme environment detection result indicates that the prefixed sound/suffixed sound is pronounced and voiced, although an amplitude of a phoneme beginning and a phoneme ending of the phoneme is large, the waveform correcting unit 104 determines that the large amplitude is due to influence of a phoneme fragment of the prefixed sound/suffixed sound and does not necessitate correction. Based on the amplitude variation of a central portion after removing the phoneme beginning and the phoneme ending, the waveform correcting unit 104 determines whether to correct the phoneme. If the prefixed sound is unvoiced and the amplitude variation is observed in the phoneme beginning of the phoneme fragment, or if the suffixed sound is unvoiced and the amplitude variation is observed in the phoneme ending of the phoneme fragment, the waveform correcting unit 104 determines that the phoneme needs to be corrected.

The waveform generating unit 106 receives an input of the input speech, the voiced/unvoiced boundary data of the input speech, the determination result by the correction determining unit 102 and a correction result by the waveform correcting unit 104. The waveform generating unit 106 connects the portions that are corrected with the portions that are not corrected and outputs the resulting speech as output speech.

Apart from the voiced/unvoiced boundary data, general phoneme boundary data can also be input into the waveform-feature-quantity calculating unit 101 shown in FIG. 2. The voiced/unvoiced determining unit 103 can be omitted when inputting the general phoneme boundary data. If the voiced/unvoiced determining unit 103 is omitted, the phoneme boundary data is also input into the waveform correcting unit 104. For example, in a syllable "ta" which includes two phoneme fragments of a consonant "t" and a vowel "a", the phonemes indicate a boundary of "t" and "a".

The phoneme environment detecting unit 101*f* shown in FIG. 2 can also be omitted. If the phoneme environment detecting unit 101*f* is omitted, detection of whether the prefixed sounds and the suffixed sounds are silent, pronounced, voiced, or unvoiced cannot be carried out. Thus, based on only the phoneme type, the phonemewise feature quantities are distributed to determining units of the phoneme type, in other words, to any one of the unvoiced plosive determining unit 102*b*, the voiced plosive determining unit 102*c*, the unvoiced fricative determining unit 102*d*, the voiced fricative determining unit 102*e*, the affricate determining unit 102*f*, and the periodic waveform determining unit 102*g*.

A speech enhancing process according to the first embodiment is explained next. FIG. 3 is a flowchart of the speech enhancing process according to the first embodiment. As shown in FIG. 3, first, the voiced/unvoiced determining unit 103 fetches the voiced/unvoiced boundary data of the input speech (step S101). If the voiced/unvoiced determining unit 103 is omitted, the speech enhancement apparatus 100 according to the first embodiment fetches the general phoneme boundary data and inputs the phoneme boundary data into the waveform-feature-quantity calculating unit 101, the waveform correcting unit 104, and the waveform generating unit 106.

Next, based on the voiced/unvoiced boundary data (the general phoneme boundary data if the voiced/unvoiced determining unit 103 is omitted), the phoneme splitting unit 101*a* splits the input speech data into the phonemes (step S102).

The amplitude variation measuring unit 101*b* calculates the amplitude values and the amplitude variation rates of the split phonemes (step S103). Next, based on the amplitude values and the amplitude variation rates, the plosive portion/aspirated portion detecting unit 101*c* detects the plosive portions/aspirated portions (step S104). Next, based on the detected plosive portions/aspirated portions and the amplitude variation rates, the phoneme classifying unit 101*d* classifies the phonemes into phoneme classes (step S105). Next, the phonemewise-feature-quantity calculating unit 101*e* calculates the feature quantities of the classified phonemes (step S106).

Next, the phoneme environment detecting unit 101*f* determines the phoneme environment, in other words, whether the speech data of the prefixed sounds/suffixed sounds of the phonemes split at step S102 is silent, pronounced, voiced or unvoiced (step S107). However, step S107 is omitted if the phoneme environment detecting unit 101*f* is omitted.

Next, based on the phoneme type and a phoneme environment determination result of the prefixed sounds/suffixed sounds, the phonemewise data distributing unit 102*a* distributes the feature quantity of each phoneme to each phoneme type (step S108). If the phoneme environment detecting unit 101*f* is omitted, based on only the phoneme type, the phonemewise data distributing unit 102*a* distributes the feature quantities of the phonemes to each phoneme type. Next, the unvoiced plosive determining unit 102*b*, the voiced plosive determining unit 102*c*, the unvoiced fricative determining unit 102*d*, the voiced fricative determining unit 102*e*, the affricate determining unit 102*f*, and the periodic waveform determining unit 102*g* determine the necessity of correction of the phonemes for each phoneme type (step S109).

Next, based on the voiced/unvoiced boundary data (the general phoneme boundary data if the voiced/unvoiced determining unit 103 is omitted), the phoneme classes and a correction determination result at step S109, the waveform correcting unit 104 refers to the phonemewise-waveform-data storage unit 105 and corrects the phonemes (step S110). Next, based on the voiced/unvoiced boundary data (the general phoneme boundary data if the voiced/unvoiced determining unit 103 is omitted), the waveform generating unit 106 connects the corrected phonemes with the not corrected phonemes and outputs the resulting speech data (step S111).

Example 2

Figure 4:
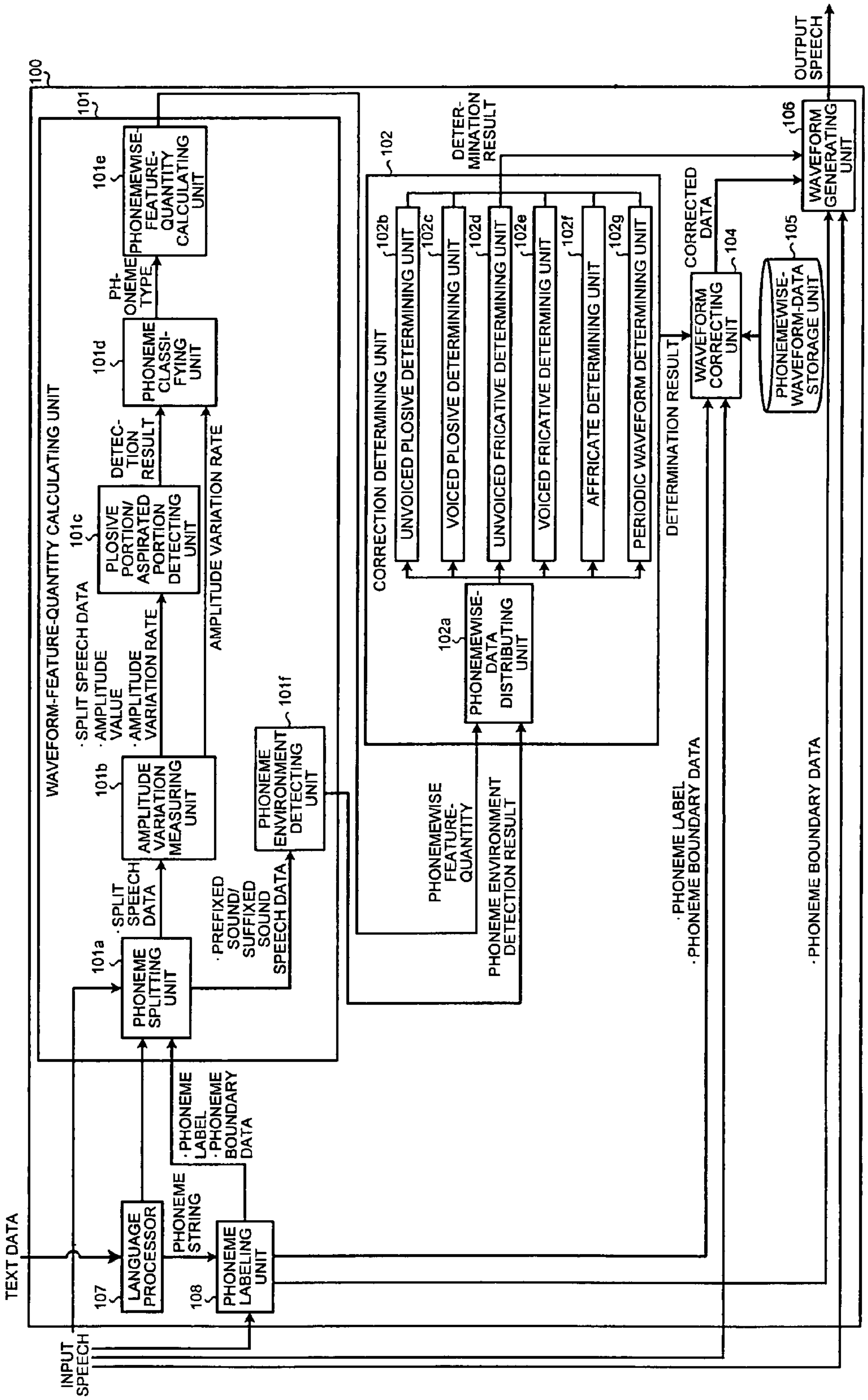
FIG. 4 is a functional block diagram of the speech enhancement apparatus according to a second embodiment of the present invention.
Figure 5:
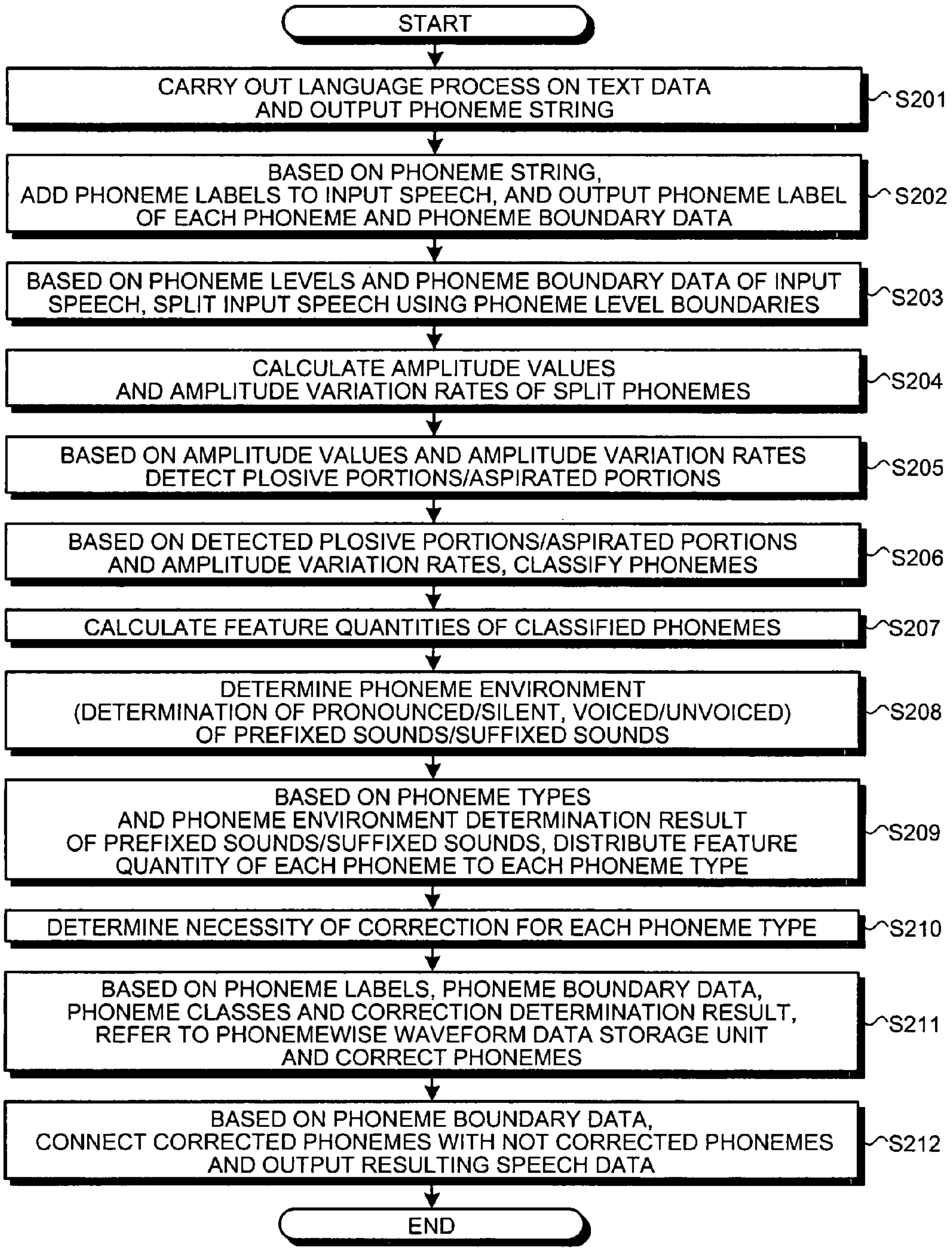
FIG. 5 is a flowchart of the speech enhancing process according to the second embodiment.

The second embodiment of the present invention is explained below with reference to FIGS. 4 and 5. Only differences between the first embodiment and the second embodiment are explained in the second embodiment. FIG. 4 is a functional block diagram of a speech enhancement apparatus according to the second embodiment. As shown in FIG. 4, the speech enhancement apparatus 100 includes the waveform feature quantity determining unit 101, the correction determining unit 102, the waveform correcting unit 104, the phonemewise-waveform-data storage unit 105, the waveform generating unit 106, a language processor 107, and a phoneme labeling unit 108. Because the waveform feature quantity determining unit 101, the correction determining unit 102, the waveform correcting unit 104, the phonemewise-waveform-data storage unit 105, and the waveform generating unit 106 are similar to the waveform feature quantity determining unit 101, the correction determining unit 102, the waveform correcting unit 104, the phonemewise-waveform-data storage unit 105, and the waveform generating unit 106 respectively in the first embodiment, an explanation is omitted.

Upon input of text data, which indicates content of the input speech, into the language processor 107, a language process is carried out and a phoneme string is output. For example, if the text data is "tadaima", the phoneme string is "tadaima". Upon input of the input speech and the phoneme string in the phoneme labeling unit 108, a phoneme labeling is carried out for the input speech, and a phoneme label of each phoneme and boundary data of each phoneme are output.

The phoneme labels and the phoneme boundary data that are output by the language processor 107 are input into the phoneme splitting unit 101*a*, the waveform correcting unit 104, and the waveform generating unit 106. Based on the phoneme labels and the phoneme boundary data, the phoneme splitting unit 101*a* splits the input speech. The waveform correcting unit 104 receives an input of the input speech, the phoneme labels, the phoneme boundary data, the determination result by the correction determining unit 102, and the phoneme classes. Based on the phonemes that need to be corrected, the waveform correcting unit 104 uses the waveform data stored in the phonemewise-waveform-data storage unit 105 to carry out substitution or addition (supplementation) to the original data, and outputs the speech data after correction. The waveform generating unit 106 receives an input of the input speech, the phoneme labels, the phoneme boundary data, the determination result by the correction determining unit 102, and the correction result by the waveform correcting unit 104. The waveform generating unit 106 connects the corrected portions of the speech data with the not corrected portions of the speech data, and outputs the resulting speech data as the output speech.

Because the phoneme labels are input into the waveform correcting unit 104, the waveform correcting unit 104 uses determination standards based on the phoneme labels to determine whether to correct each phoneme. For example, if the phoneme label is "k", a length of the affricate portion being greater than or equal to the threshold value is used as one of the determination standards.

Upon input of the phoneme labels and the phonemewise feature quantities, based on each phoneme label and the feature quantity, the correction determining unit 102 according to the second embodiment determines whether to correct the phonemes. For example, upon the phoneme label being "k", whether the phoneme includes only one plosive portion, whether a maximum value of an amplitude absolute value of the plosive portion is less than or equal to the threshold value, and whether the length of the aspirated portion is greater than or equal to the threshold value are used as the determination standards. Upon the phoneme being "p" or "t", whether the phoneme includes only one plosive portion, and whether the maximum value of the amplitude absolute value of the plosive portion is less than or equal to the threshold value are used as the determination standards.

Upon the phoneme being "b", "d", or "g", whether the plosive portion exists and whether the periodic waveform portion exists are used as the determination standards. The phoneme is corrected if the plosive portion does not exist. If the phoneme label is "r", whether the plosive portion exists is used as the determination standard and the phoneme is corrected if the plosive portion exists. If the phoneme label is "s", "sH", "f", "h", "j", or "z", the amplitude variation and whether the maximum value of the amplitude absolute value of the plosive portion is less than or equal to the threshold value are used as the determination standards.

Accordingly, because the phoneme labels are input into the correction determining unit 102, for example, if the phoneme is not audible as "k" due to the short aspirated portion even if the phoneme label is "k", if the phoneme is mistakenly audible as "r" due to absence of the plosive portion even if the phoneme label is "d", if the phoneme cannot be differentiated from "n" due to absence of the plosive portion even if the phoneme label is "g", or if the phoneme is audible as "g" due to noise even if the phoneme label is "n", the correction determining unit 102 determines to correct the phonemes.

The input speech, phoneme label boundary data of the input speech, determination data, and the phoneme classes are input into the waveform correcting unit 104 according to the second embodiment. The waveform correcting unit 104 uses data stored in the phonemewise-waveform-data storage unit 105 to carry out substitution or addition to the original data, deletion of the plosive portions, deletion of the frames having a large amplitude variation rate etc. to correct the phonemes and outputs the speech data after correction.

If the phoneme label is "k", the phonemewise feature quantity calculated by the phonemewise-feature-quantity calculating unit 101*e* includes any one or more of existence or absence of the plosive portions, the lengths of the plosive portions, the number of the plosive portions, the maximum value of the amplitude absolute value of the plosive portions, and the lengths of the aspirated portions that continue after the plosive portions. If the phoneme label is "b", "d", or "g", the phonemewise feature quantity includes any one or more of existence or absence of the plosive portions, existence or absence of the periodic waveforms, and the phoneme environment before the phoneme. If the phoneme label is "s" or "sH", the feature quantity includes any one or more of the amplitude variation and the phoneme environment before and after the phoneme.

A speech enhancing process according to the second embodiment is explained next. FIG. 5 is a flowchart of the speech enhancing process according to the second embodiment. As shown in FIG. 5, first the language processor 107 receives an input of the text data corresponding to the input speech, carries out the language process on the text data, and outputs the phoneme string (step S201).

Next, based on the phoneme string, the phoneme labeling unit 108 adds the phoneme labels to the input speech, and outputs the phoneme label of each phoneme and the phoneme boundary data (step S202). Next, based on the phoneme label of each phoneme and the phoneme boundary data, the phoneme splitting unit 101*a* uses the phoneme label boundaries to split the input speech into the phonemes (step S203).

Next, the amplitude variation measuring unit 101*b* calculates the amplitude values and the amplitude variation rates of the split phonemes (step S204). Next, based on the amplitude values and the amplitude variation rates, the plosive portion/aspirated portion detecting unit 101*c* detects the plosive portions/aspirated portions (step S205). Next, based on the detected plosive portions/aspirated portions and the amplitude variation rates, the phoneme classifying unit 101*d* classifies the phonemes into the phoneme classes (step S206). Next, the phonemewise-feature-quantity calculating unit 101*e* calculates the feature quantities of the classified phonemes (step S207).

Next, the phoneme environment detecting unit 101*f* determines the phoneme environment, in other words, whether the speech data of the prefixed sounds/suffixed sounds of the phonemes split at step S203 is silent, pronounced, voiced or unvoiced (step S208).

Next, based on the phoneme type and the phoneme environment determination result of the prefixed sounds/suffixed sounds, the phonemewise data distributing unit 102*a* distributes the feature quantity of each phoneme to each phoneme type (step S209). Next, the unvoiced plosive determining unit 102*b*, the voiced plosive determining unit 102*c*, the unvoiced fricative determining unit 102*d*, the voiced fricative determining unit 102*e*, the affricate determining unit 102*f*, and the periodic waveform determining unit 102*g* determine for each phoneme type whether the phonemes need to be corrected (step S210).

Next, based on the phoneme labels, the phoneme boundary data, the phoneme classes and the correction determination result at step S109, the waveform correcting unit 104 refers to the phonemewise-waveform-data storage unit 105 and corrects the phonemes (step S211). Next, based on the phoneme labels and the phoneme boundary data, the waveform generating unit 106 connects the corrected phonemes with the not corrected phonemes and outputs the resulting speech data (step S212).

Figure 6:
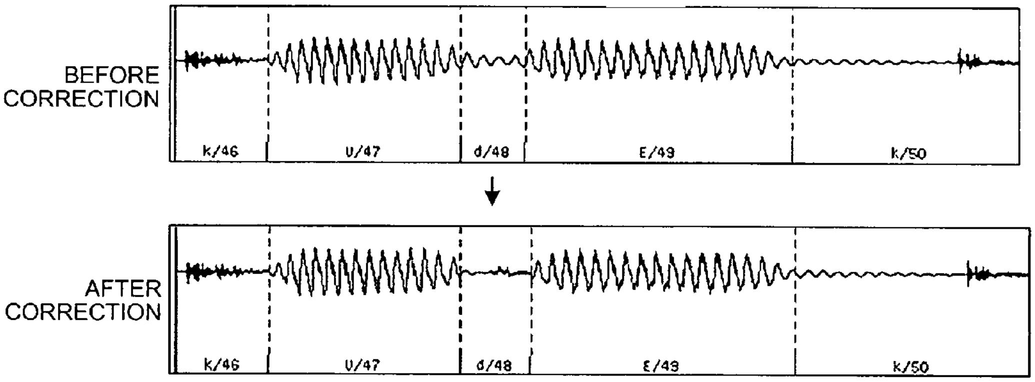
FIG. 6 is a schematic view of an example of correction in which a phoneme “d” without a plosive portion is substituted by a phoneme “d” with the plosive portion.
Figure 7:
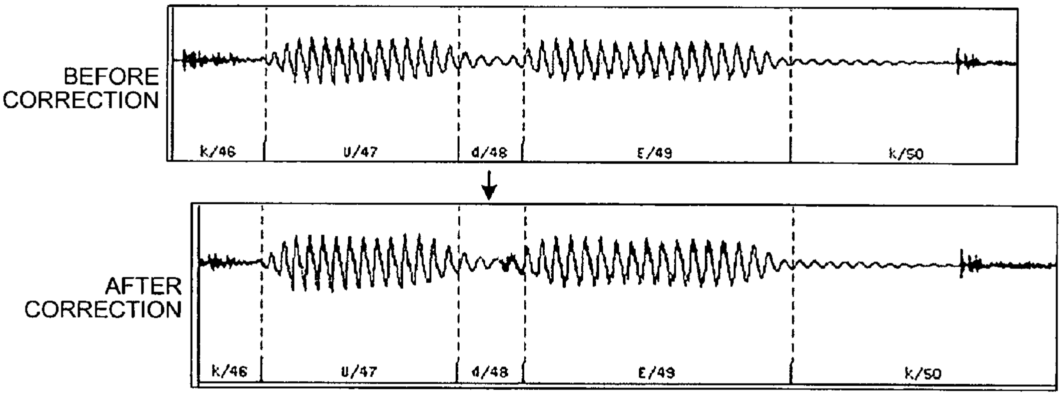
FIG. 7 is a schematic view of an example of correction in which the phoneme “d” without the plosive portion is supplemented by the phoneme “d” with the plosive portion.
Figure 8:
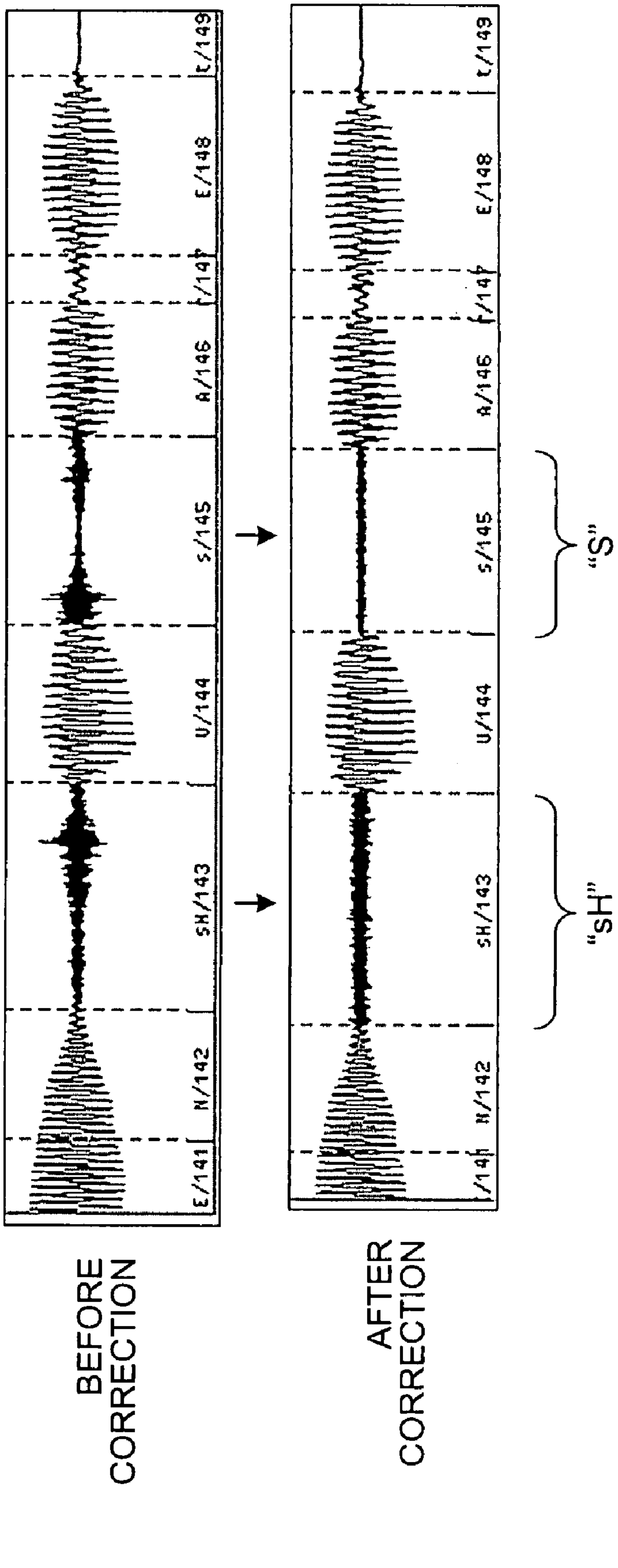
FIG. 8 is a schematic view of an example of correction in which “sH” and “s” that include a lip noise are substituted.

An outline of waveform correction by the waveform correcting unit 104 according to the first and the second embodiments is explained next. FIGS. 6 to 8 are schematic views for explaining the outline of waveform correction by the waveform correcting unit 104. In an example shown in FIG. 6, the phoneme "d" without the plosive portion is detected from the calculation result of the waveform-feature-quantity calculating unit 101. Upon the correction determining unit 102 determining that the phoneme I"d" needs to be corrected, the phoneme "d" is substituted by a phoneme "d" that is stored in the phonemewise-waveform-data storage unit 105 and that includes the plosive portion.

In an example shown in FIG. 7, the phoneme "d" without the plosive portion is supplemented by the phoneme "d" that is stored in the phonemewise-waveform-data storage unit 105 and that includes the plosive portion.

In an example shown in FIG. 8, the unvoiced affricates "sH" and "s" that include a large amplitude variation due to lip noise are substituted by "sH" and "s" that are stored in the phonemewise-waveform-data storage unit 105 and that do not include the amplitude variation.

For example, because "d" in "tadaima" does not include the plosive portion, "d" is mistakenly audible as "r" and "tadaima" is heard as "taraima". The waveform correction shown in FIGS. 7 and 8 is carried out to effectively enhance such examples of the speech data.

In a method according to another embodiment of the waveform correcting unit 104, if a plosive includes two plosive portions, one of the plosive portions is deleted. Further, in another method, if a fricative includes a short interval having a large amplitude variation, the interval having the large amplitude variation is deleted. Thus, data stored in the "phonemewise-waveform-data storage unit" is used to carry out substitution, supplementation, or deletion from the original data, thereby carrying out waveform correction.

Example 3

Figure 9:
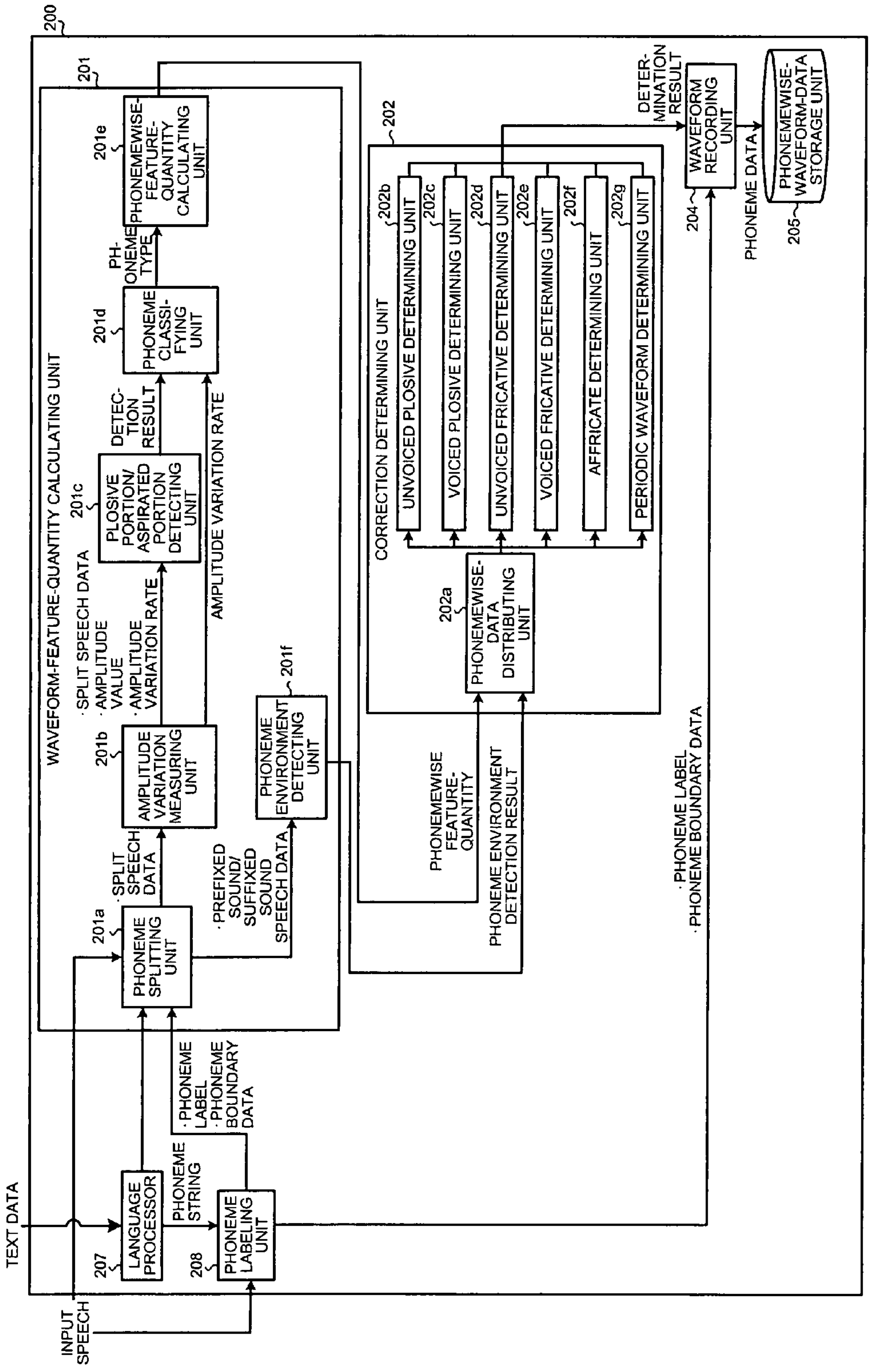
FIG. 9 is a functional block diagram of a speech recording apparatus according to a third embodiment of the present invention.
Figure 10:
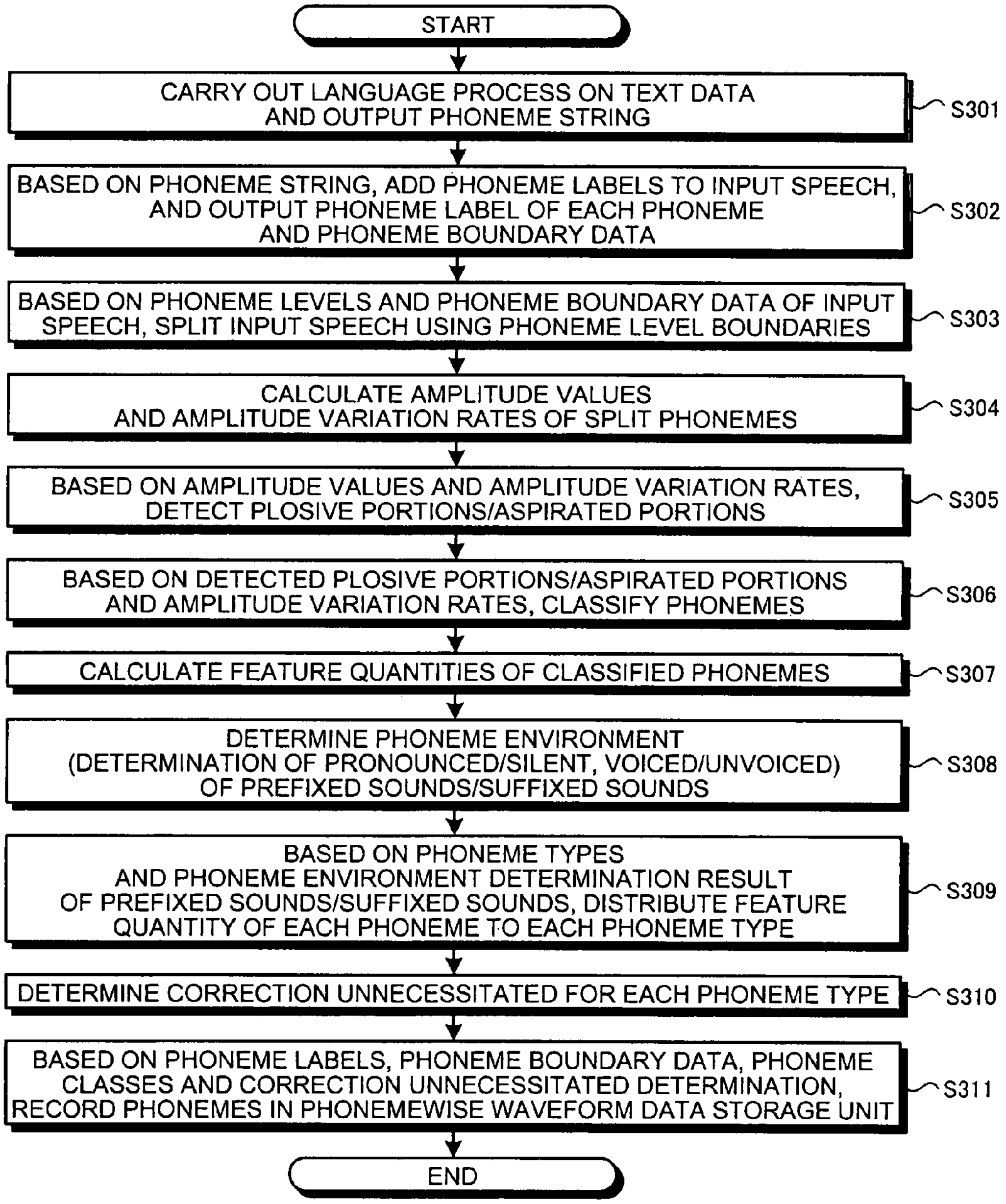
FIG. 10 is a flowchart of a speech recording process according to the third embodiment.

The third embodiment of the present invention is explained below with reference to FIGS. 9 and 10. The third embodiment is related to the speech recording apparatus for storing the phonemes in the phonemewise-waveform-data storage unit 105 according to the first and the second embodiments. In the third embodiment, a phonemewise-waveform-data storage unit 205 is used as the phonemewise-waveform-data storage unit 105. FIG. 9 is a functional block diagram of the speech recording apparatus according to the third embodiment. As shown in FIG. 9, a speech recording apparatus 200 includes a waveform-feature-quantity calculating unit 201, a recording determining unit 202, a waveform recording unit 204, the phonemewise-waveform-data storage unit 205, a language processor 207, and a phoneme labeling unit 208.

The waveform-feature-quantity calculating unit 201 further includes a phoneme splitting unit 201*a*, an amplitude variation measuring unit 201*b*, a plosive portion/aspirated portion detecting unit 201$c$, a phoneme classifying unit 201$d$, a phonemewise-feature-quantity calculating unit 201$e$, and a phoneme environment detecting unit 201$f$. Because the phoneme splitting unit 201$a$, the amplitude variation measuring unit 201$b$, the plosive portion/aspirated portion detecting unit 201$c$, the phoneme classifying unit 201$d$, the phonemewise-feature-quantity calculating unit 201$e$, and the phoneme environment detecting unit 201$f$ are the same as the phoneme splitting unit 101$a$, the amplitude variation measuring unit 101$b$, the plosive portion/aspirated portion detecting unit 101$c$, the phoneme classifying unit 101$d$, the phonemewise-feature-quantity calculating unit 101$e$, and the phoneme environment detecting unit 101$f$ respectively according to the first and the second embodiments, an explanation is omitted.

The recording determining unit 202 is basically the same as the correction determining unit 102 according to the first and the second embodiments. The recording determining unit 202 includes a phonemewise data distributing unit 202$a$, an unvoiced plosive determining unit 202$b$, a voiced plosive determining unit 202$c$, an unvoiced fricative determining unit 202$d$, a voiced fricative determining unit 202$e$, an affricate determining unit 202$f$, and a periodic waveform determining unit 202$g$ that are the same as the phonemewise data distributing unit 102$a$, the unvoiced plosive determining unit 102$b$, the voiced plosive determining unit 102$c$, the unvoiced fricative determining unit 102$d$, the voiced fricative determining unit 102$e$, the affricate determining unit 102$f$, and the periodic waveform determining unit 102$g$ respectively according to the first and the second embodiments.

Based on the feature quantity of each phoneme class, the correction determining unit 102 according to the second embodiment selects the phoneme fragments with defects as the phoneme fragments necessitating correction. However, based on the feature quantity of each phoneme class, the recording determining unit 202 according to the third embodiment determines the phoneme fragments without defects. For example, upon the phoneme being the unvoiced plosive "k", whether the phoneme includes only one plosive portion, whether the length of the aspirated portion is greater than or equal to the threshold value, and whether the amplitude value of the plosive portion is within the threshold value are used as the determination standards by the recording determining unit 202 to determine whether to record the phoneme. Upon the phoneme being the unvoiced fricative "s" or "sH", whether the amplitude variation rate is not large, whether all the amplitude values are within a predetermined range, and whether the phoneme length is greater than or equal to the threshold value are used as the determination standards by the recording determining unit 202 to determine whether to record the phonemes. Upon the phoneme being the voiced plosive "b", "d", or "g", absence of the periodic component and existence of the plosive portion are used as the determination standards by the recording determining unit 202 to determine whether to record the phoneme.

Based on a determination result of the recording determining unit 202, the waveform recording unit 204 stores in the phonemewise-waveform-data storage unit 205, the phoneme labels and the phoneme boundary data of the phoneme fragments for recording. The phonemewise-waveform-data storage unit 205 is provided as the phonemewise-waveform-data storage unit 105 in the first and the second embodiments.

Further, because the phonemewise-waveform-data storage unit 205 according to the third embodiment is provided as the phonemewise-waveform-data storage unit 105 in the first and the second embodiments, the phonemewise-waveform-data storage unit 205 can also be provided as a storage unit having a structure that is independent of the speech recording apparatus 200. Similarly, the phonemewise-waveform-data storage unit 105 in the first and the second embodiments can also be provided independently from the speech enhancement apparatus 100.

Because the language processor 207 and the phoneme labeling unit 208 are the same as the language processor 107 and the phoneme labeling unit 108 respectively according to the second embodiment, an explanation is omitted.

A speech recording process according to the third embodiment is explained next. FIG. 10 is a flowchart of the speech recording process according to the third embodiment. As shown in FIG. 10, first, the language processor 207 receives an input of the text data corresponding to the input speech, carries out the language process on the text data, and outputs the phoneme string (step S301).

Next, based on the phoneme string, the phoneme labeling unit 208 adds the phoneme labels to the input speech and outputs the phoneme label of each phoneme and the phoneme boundary data (step S302). Next, based on the phoneme label of each phoneme and the phoneme boundary data, the phoneme splitting unit 201$a$ uses the phoneme label boundaries to split the input speech into the phonemes (step S303).

Next, the amplitude variation measuring unit 201$b$ calculates the amplitude values and the amplitude variation rates of the split phonemes (step S304). Next, based on the amplitude values and the amplitude variation rates, the plosive portion/aspirated portion detecting unit 201$c$ detects the plosive portions/aspirated portions (step S305). Next, based on the detected plosive portions/aspirated portions and the amplitude variation rates, the phoneme classifying unit 201$d$ classifies the phonemes into the phoneme classes (step S306). Next, the phonemewise-feature-quantity calculating unit 201$e$ calculates the feature quantities of the classified phonemes (step S307).

Next, the phoneme environment detecting unit 201$f$ determines the phoneme environment, in other words, whether the speech data of the prefixed sounds/suffixed sounds of the phonemes split at step S303 is silent, pronounced, voiced or unvoiced (step S308).

Next, based on the phoneme type and the phoneme environment determination result of the prefixed sounds/suffixed sounds, the phonemewise data distributing unit 202$a$ distributes the feature quantity of each phoneme to each phoneme type (step S309). Next, the unvoiced plosive determining unit 202$b$, the voiced plosive determining unit 202$c$, the unvoiced fricative determining unit 202$d$, the voiced fricative determining unit 202$e$, the affricate determining unit 202$f$, and the periodic waveform determining unit 202$g$ determine for each phoneme type whether the phonemes need to be corrected (step S310).

Next, based on the phoneme labels, the phoneme boundary data, the phoneme classes and a recording determination result at step S310, the waveform recording unit 204 records the phonemes in the phonemewise-waveform-data storage unit 205 (step S311).

In the present invention, a correction determination standard is included for each class of phonemes. A high precision detection of the plosive portions is used for the plosives. Due to this, existence of two plosive portions or the lengths of the aspirated portions that continue after the plosive portion can also be detected. Further, a precise amplitude variation can be detected for the fricatives. According to claim 5, using data of the prefixed sounds and the suffixed sounds of the phoneme fragments enables to carry out further high precision correction determination.

Correcting methods include methods that enable to replace detected defective fragments by substitute fragments, supplement the original speech with the substitute fragments and supplement deficient plosive portions. Due to this, a volume of fricative or plosive which is extremely difficult to hear can be corrected. Further, overlapped plosives can also be corrected to a single plosive.

Apart from correcting the speech data, "tadaima" that is mistakenly input as "taraima" in the input text can be corrected. Similarly, if a user finds it difficult to comprehend whether a text portion includes "kokugai" or "kokunai", the text portion can be corrected.

All the processes explained in the embodiments mentioned earlier can be realized by executing a computer program that includes regulated sequences of the processes using a computer system such as a personal computer, a server, or workstation.

The invention in its broader aspects is not limited to the specific details and representative embodiments shown and described herein. Accordingly, various modifications may be made without departing from the spirit or scope of the general inventive concept as defined by the appended claims and their equivalents. Further, effects described in the embodiments are not to be thus limited.

According to an embodiment of the present invention, based on a waveform feature quantity of speech data of each phoneme that is separated by phoneme boundary data, if the speech data needs to be corrected, waveform data that is prior stored in a phonemewise-waveform-data storage unit is used to correct the speech data of each phoneme. Due to this, the speech data that is unclear and difficult to hear is corrected for each phoneme and the speech data that is easier to hear can be obtained.

According to an embodiment of the present invention, based on the waveform feature quantity of the speech data of each phoneme that is separated by voiced/unvoiced boundary data, if the speech data needs to be corrected, the waveform data that is prior stored in the phonemewise-waveform-data storage unit is used to correct the speech data of each phoneme. Due to this, the speech data that is unclear and difficult to hear is corrected for each phoneme that is separated by the voiced/unvoiced boundary data and the speech data that is easier to hear can be obtained.

According to an embodiment of the present invention, phoneme identification data is assigned to a phoneme string that is obtained by carrying out a language process on text data and boundaries of the phoneme identification data are determined to get boundary data of the phoneme identification data. Based on the waveform feature quantity of the speech data of each phoneme that is separated by the boundary data, if the speech data needs to be corrected, the waveform data that is prior stored in the phonemewise-waveform-data storage unit is used to correct the speech data of each phoneme. Due to this, the speech data that is unclear and difficult to hear is corrected for each phoneme that is separated by the phoneme identification data and the speech data that is easier to hear can be obtained.

According to an embodiment of the present invention, amplitude values, amplitude variation rates, and existence or absence of periodic waveforms in the phonemes of the speech data are measured. Based on a result of detection of plosive portions and aspirated portions of the phonemes, phoneme types of the phonemes are classified, and the feature quantity of each classified phoneme is calculated. Due to this, speech portions such as consonants and unvoiced vowels, which are likely to be unclear, can be detected and corrected.

According to an embodiment of the present invention, the input speech data is synthesized with the speech data of each phoneme that is corrected by a waveform correcting unit to output a resulting speech data. Thus, only the unclear portions are corrected in the speech data that is output and the unclear portions can be corrected without significantly changing original characteristics of the speech data.

According to an embodiment of the present invention, the phoneme identification data is assigned to the phoneme string that is obtained by carrying out the language process on the text data and boundaries of the phoneme identification data are determined to get the boundary data of the phoneme identification data. For each phoneme that is separated by the boundary data, the speech data that satisfies predetermined conditions is recorded in the phonemewise-waveform-data storage unit, and the recorded speech data can be used for correction.

The present invention is effective in obtaining clear speech data by correcting unclear portions of the speech data and can be especially applied to automatically detect and automatically correct defective portions related to plosives such as existence or absence of plosive portions, phoneme lengths of aspirated portions that continue after the plosive portions or defective portions related to amplitude variation of fricatives.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A speech enhancement apparatus that corrects and outputs unclear portions of input speech data, the speech enhancement apparatus comprising:

a voiced/unvoiced-boundary-data output unit that determines a separation of voiced/unvoiced of the input speech data and outputs voiced/unvoiced boundary data as phoneme boundary data that splits the input speech data into a plurality of phonemes;

a waveform-feature-quantity calculating unit that calculates a waveform feature quantity of the input speech data for each of the plurality of phonemes, the input speech data being input along with the phoneme boundary data, wherein the waveform feature quantity includes at least one of amplitude values, amplitude variation rates, existence or absence of periodic waveforms, of the phonemes, existence or absence of plosive portions of the phonemes, lengths of the plosive portions, existence or absence of aspirated portions that continue after the plosive portions, lengths of the aspirated portions, and phoneme types of the phonemes before and after the phonemes;

a correction determining unit that determines a necessity of correction of the input speech data for each of the plurality of phonemes, based on the waveform feature quantity calculated by the waveform-feature-quantity calculating unit; and a waveform correcting unit that corrects a phoneme of the plurality of phonemes which is determined to be corrected by the correction determining unit by using waveform data that is prior stored in a phonemewise-waveform-data storage unit, wherein the waveform-feature-quantity calculating unit includes a speech data splitting unit that splits the input speech data into the phonemes based on the phoneme boundary data, an amplitude variation measuring unit that measures amplitude values, amplitude variation rates, and existence or absence of periodic waveforms of the phonemes, based on the phonemes that are split by the speech data splitting unit, a plosive portion/aspirated portion detecting unit that detects plosive portions and aspirated portions of the phonemes, based on the amplitude values and the amplitude variation rates that are measured by the amplitude variation measuring unit and the input speech data that is split by the speech data splitting unit, a phoneme classifying unit that classifies phoneme types of the phonemes, based on a detection result by the plosive portion/aspirated portion detecting unit, and the amplitude values, the amplitude variation rates, and existence or absence of the periodic waveforms that are measured by the amplitude variation measuring unit, and a phonemewise-feature-quantity calculating unit that calculates a feature quantity for each of the phonemes that are classified by the phoneme classifying unit.

2. The speech enhancement apparatus according to claim 1, further comprising:

a phoneme-identification-data output unit that assigns phoneme identification data to the input speech data based on the input speech data and a phoneme string that is output by carrying out a language process on text data of the input speech data, determines boundaries of the phoneme identification data, and outputs boundary data of the phoneme identification data as the phoneme boundary data, wherein the waveform-feature-quantity calculating unit calculates the waveform feature quantity of the input speech data for each of the phonemes, the input speech data being input along with the boundary data of the phoneme identification data output by the phoneme-identification-data output unit.

3. The speech enhancement apparatus according to claim 1, wherein the phonemewise-feature-quantity calculating unit calculates as the feature quantity, at least one of the amplitude values, the amplitude variation rates, and existence or absence of the periodic waveforms that are measured by the amplitude variation measuring unit, existence or absence of the plosive portions of the phonemes, lengths of the plosive portions, existence or absence of the aspirated portions that continue after the plosive portions, and lengths of the aspirated portions that are detected by the plosive portion/aspirated portion detecting unit, and the phoneme types of the phonemes before and after the phonemes that are classified by the phoneme classifying unit.

4. The speech enhancement apparatus according to claim 1, wherein the correction determining unit determines whether correction of the input speech data is necessitated for each phoneme according to the phoneme types that are classified by the phoneme classifying unit.

5. The speech enhancement apparatus according to claim 1, wherein the waveform-feature-quantity calculating unit further includes a phoneme environment detecting unit that detects a difference of pronounced/silent and a difference of voiced/unvoiced in the phonemes before and after the phonemes that are split by the speech data splitting unit, and wherein the correction determining unit determines the necessity of correction of the input speech data for each phoneme, based on a detection result by the phoneme environment detecting unit along with the waveform feature quantity that is calculated by the waveform-feature-quantity calculating unit.

6. The speech enhancement apparatus according to claim 1, further comprising an output speech data synthesizer that synthesizes the input speech data with the input speech data of each phoneme that is corrected by the waveform correcting unit, and outputs the synthesized input speech data, based on the phoneme boundary data and a determination result by the correction determining unit.

7. A speech recording apparatus that records input speech data in a phonemewise-waveform-data storage unit, the speech recording apparatus comprising:

a phoneme-identification-data output unit that assigns phoneme identification data to the input speech data, based on the input speech data and a string of phonemes that is output by carrying out a language process on text data of the input speech data, determines boundaries of the phoneme identification data, and outputs boundary data of the phoneme identification data as phoneme boundary data;

a waveform-feature-quantity calculating unit that calculates a waveform feature quantity of the input speech data for each of the phonemes, the input speech data being input along with the boundary data of the phoneme identification data output by the phoneme-identification-data output unit, wherein the waveform feature quantity includes at least one of amplitude values, amplitude variation rates, existence or absence of periodic waveforms, of the phonemes, existence or absence of plosive portions of the phonemes, lengths of the plosive portions, existence or absence of aspirated portions that continue after the plosive portions, lengths of the aspirated portions, and phoneme types of the phonemes before and after the phonemes;

a condition sufficiency determining unit that determines whether the input speech data satisfies predetermined conditions for each phoneme, based on the waveform feature quantity calculated by the waveform-feature-quantity calculating unit; and a phonemewise-waveform-data recording unit that records in the phonemewise-waveform-data storage unit, the input speech data of each phoneme that is determined to be satisfied the predetermined conditions, based on a determination by the condition sufficiency determining unit, wherein the waveform-feature-quantity calculating unit includes a speech data splitting unit that splits the input speech data into the phonemes based on the phoneme boundary data, an amplitude variation measuring unit that measures an amplitude value and an amplitude variation rate for each of the phonemes that are split by the speech data splitting unit, a plosive portion/aspirated portion detecting unit that detects plosive portions and aspirated portions of the phonemes, based on the amplitude value and the amplitude variation rate that are measured by the amplitude variation measuring unit and the input speech data that is split by the speech data splitting unit, a phoneme classifying unit that classifies each of the phonemes into phoneme types, based on the amplitude value and the amplitude variation rate that are measured by the amplitude variation measuring unit, and a phonemewise-feature-quantity calculating unit that calculates a feature quantity for each of the phonemes that are classified by the phoneme classifying unit according to each of the phoneme types.

8. A speech enhancing method that corrects and outputs unclear portions of input speech data, the speech enhancing method comprising:

determining a separation of voiced/unvoiced of the input speech data and outputting voiced/unvoiced boundary data as phoneme boundary data that splits the input speech data into a plurality of phonemes;

calculating a waveform feature quantity of the input speech data for each of the plurality of the phonemes, the input speech data being input along with the phoneme boundary data, wherein the waveform feature quantity includes at least one of amplitude values, amplitude variation rates, existence or absence of periodic waveforms, of the phonemes, existence or absence of plosive portions of the phonemes, lengths of the plosive portions, existence or absence of aspirated portions that continue after the plosive portions, lengths of the aspirated portions, and phoneme types of the phonemes before and after the phonemes;

determining a necessity of correction of the input speech data for each of the plurality of phonemes, based on the waveform feature quantity calculated in the calculating; and correcting a phoneme of the plurality of phonemes which is determined to be corrected in the determining, by using waveform data that is prior stored in a phonemewise-waveform-data storage unit, wherein the calculating includes splitting the input speech data into the phonemes based on the phoneme boundary data, measuring amplitude values, amplitude variation rates, and existence or absence of periodic waveforms of the phonemes, based on the phonemes that are split in the splitting, detecting plosive portions and aspirated portions of the phonemes, based on the amplitude values and the amplitude variation rates that are measured in the measuring and the input speech data that is split in the splitting, classifying phoneme types of the phonemes, based on a detection result in the detecting, and the amplitude values, the amplitude variation rates, and existence or absence of the periodic waveforms that are measured in the measuring, and calculating a feature quantity for each of the phonemes that are classified in the classifying.

9. A speech recording method that corrects and outputs unclear portions of input speech data, the speech recording method comprising:

assigning phoneme identification data to the input speech data, based on the input speech data and a string of phonemes that is output by carrying out a language process on text data of the input speech data, determining boundaries of the phoneme identification data, and outputting boundary data of the phoneme identification data as phoneme boundary data;

calculating a waveform feature quantity of the input speech data for each of the phonemes, the input speech data being input along with the boundary data of the phoneme identification data output from the outputting, wherein the waveform feature quantity includes at least one of amplitude values, amplitude variation rates, existence or absence of periodic waveforms, of the phonemes, existence or absence of plosive portions of the phonemes, lengths of the plosive portions, existence or absence of aspirated portions that continue after the plosive portions, lengths of the aspirated portions, and phoneme types of the phonemes before and after the phonemes;

determining whether the input speech data satisfies predetermined conditions for each phoneme, based on the waveform feature quantity calculated in the calculating; and recording in the phonemewise-waveform-data storage unit, the input speech data of each phoneme that is determined to be satisfied the predetermined conditions, based on a determination in the determining, wherein the calculating includes splitting the input speech into the phonemes based on the phoneme boundary data, measuring an amplitude value and an amplitude variation rate for each of the phonemes that are split in the splitting, detecting plosive portions and aspirated portions of the phonemes, based on the amplitude value and the amplitude variation rate that are measured in the measuring and the input speech data that is split in the splitting, classifying each of the phonemes into phoneme types, based on the amplitude value and the amplitude variation rate that are measured in the measuring, and calculating a feature quantity for each of the phonemes that are classified in the classifying according to each of the phoneme types.

* * * * *